Figure 1:
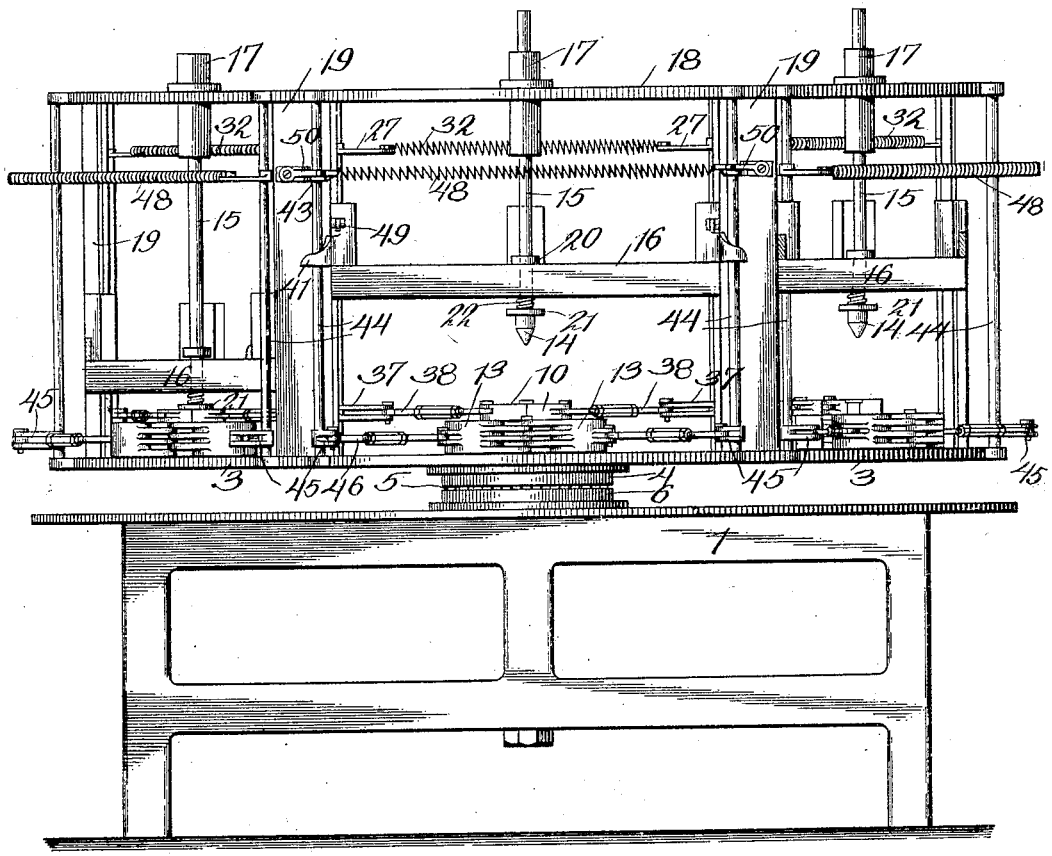

No. 810,031. PATENTED JAN. 16, 1906.
H. M. BROOKFIELD.
PRESS FOR MAKING GLASS ARTICLES.
APPLICATION FILED APR. 6, 1903.

7 SHEETS—SHEET 1.

WITNESSES:
John O. Gumpler
Edward F. Daly

INVENTOR
Henry M. Brookfield,
BY
Kenyon & Kenyon
ATTORNEYS.

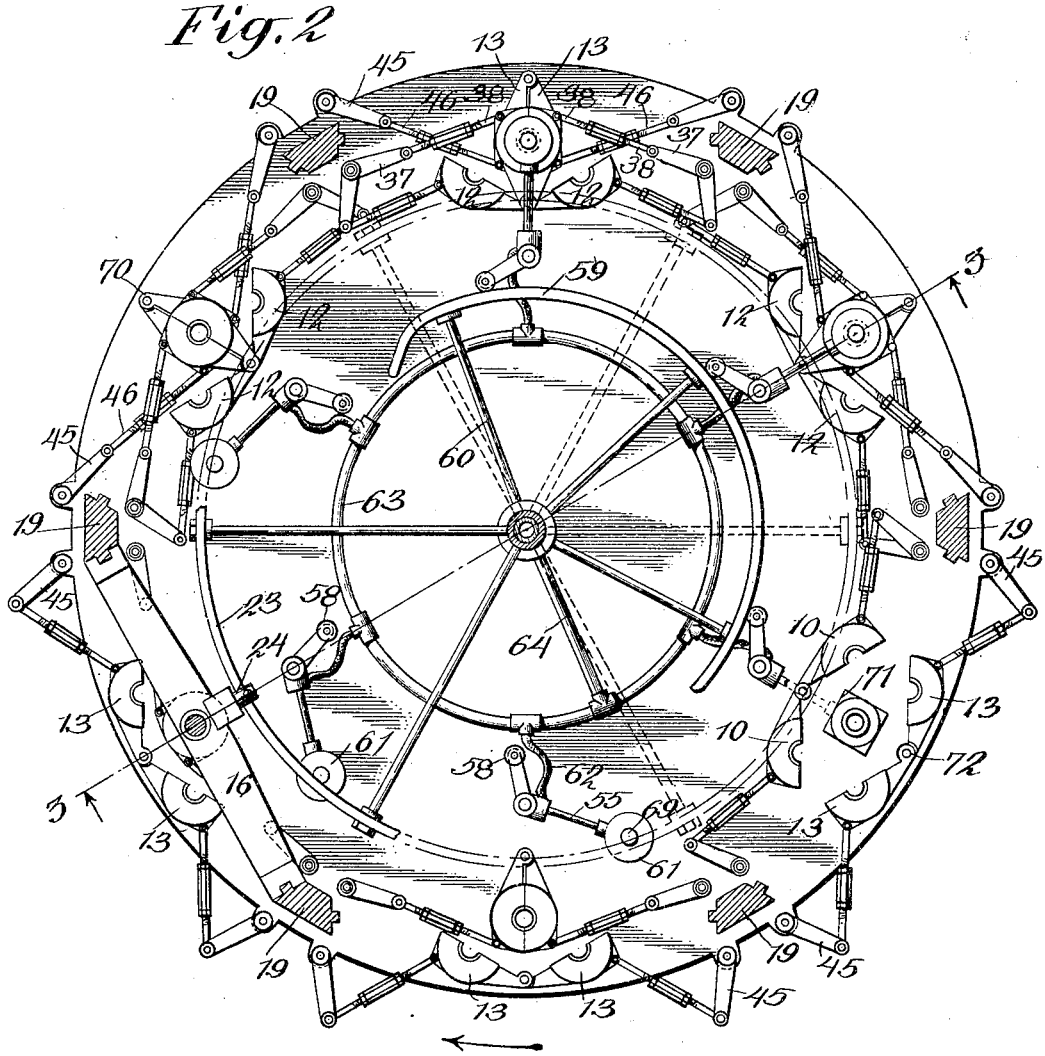

No. 810,031. PATENTED JAN. 16, 1906.
H. M. BROOKFIELD.
PRESS FOR MAKING GLASS ARTICLES.
APPLICATION FILED APR. 6, 1903.
7 SHEETS—SHEET 3.
*Fig. 3,*
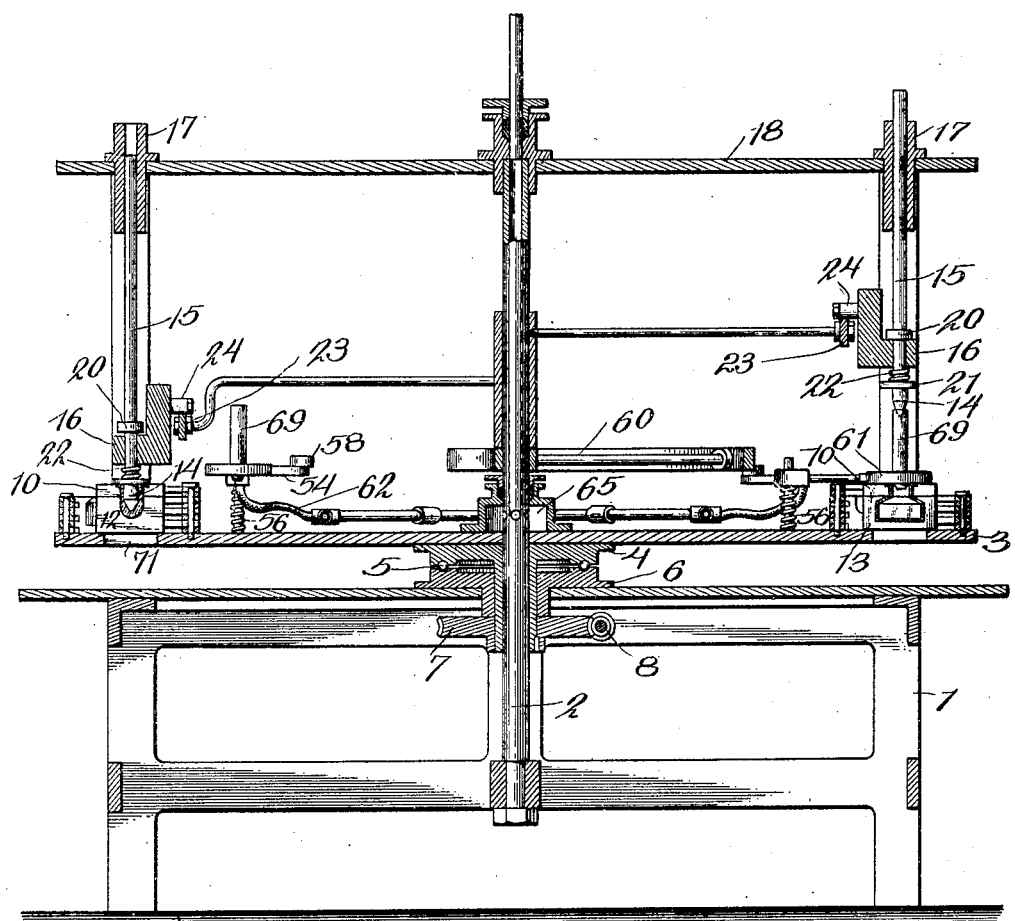
WITNESSES:
INVENTOR,
Henry M. Brookfield,
BY
Kenyon & Kenyon,
ATTORNEYS.

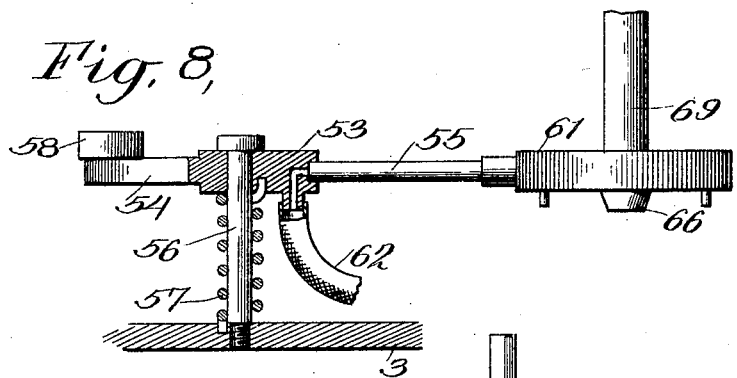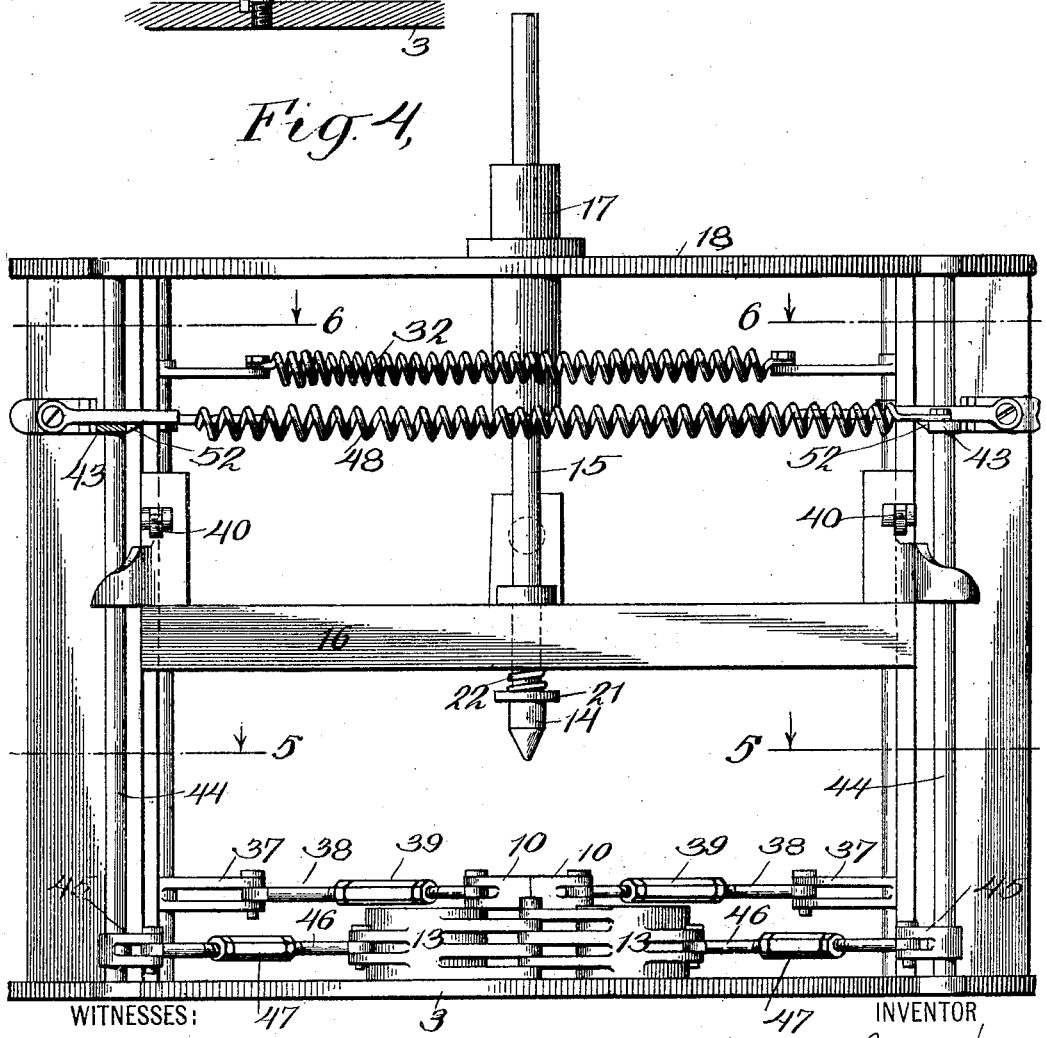

No. 810,031.  PATENTED JAN. 16, 1906.
H. M. BROOKFIELD.
PRESS FOR MAKING GLASS ARTICLES.
APPLICATION FILED APR. 6, 1903.

7 SHEETS—SHEET 5.

Witnesses:
John O. Gempler
Edward F. Daly

Henry M. Brookfield, Inventor,
BY Kenyon & Kenyon
ATTORNEYS.

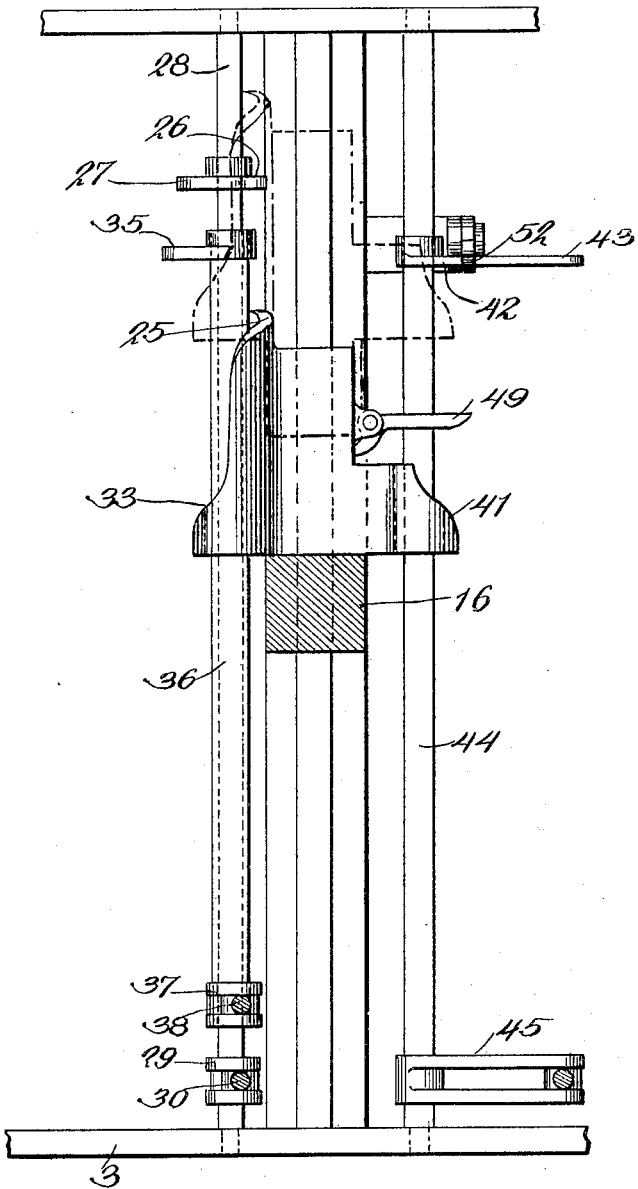

No. 810,031. PATENTED JAN. 16, 1906.
H. M. BROOKFIELD.
PRESS FOR MAKING GLASS ARTICLES.
APPLICATION FILED APR. 6, 1903.
7 SHEETS—SHEET 7.
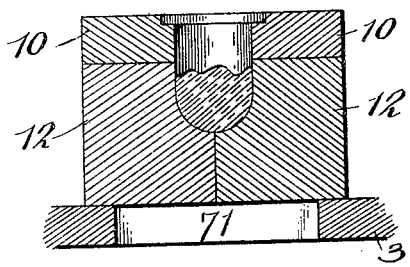
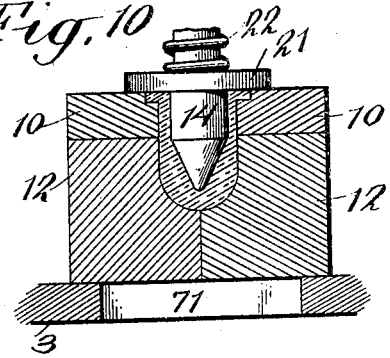
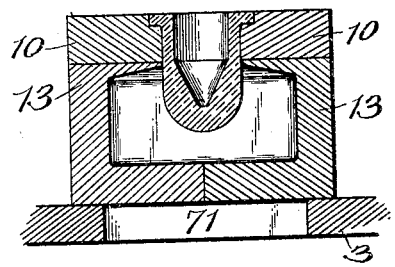
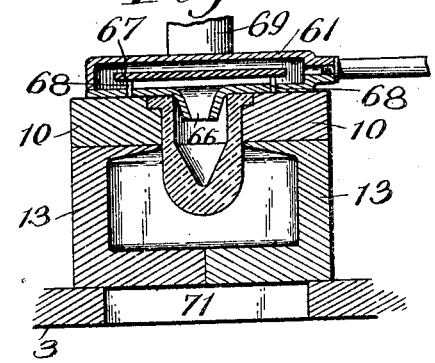
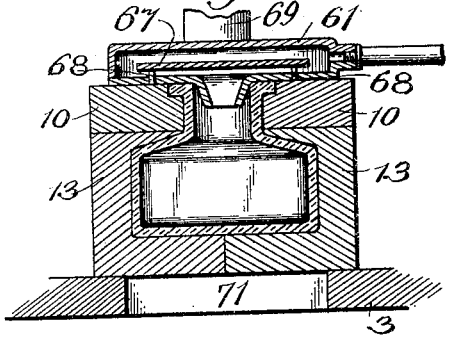
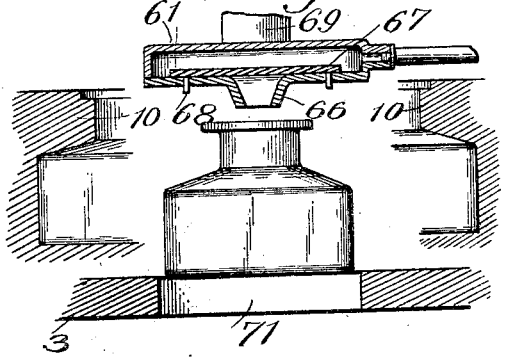
WITNESSES:
John O. Gumpey
Edward F. Daly
INVENTOR,
Henry M. Brookfield,
BY
Kenyon & Kenyon
ATTORNEYS.

UNITED STATES PATENT OFFICE.

HENRY M. BROOKFIELD, OF NEW YORK, N. Y.

PRESS FOR MAKING GLASS ARTICLES.

No. 810,031.      Specification of Letters Patent.      Patented Jan. 16, 1906.

Application filed April 6, 1903. Serial No. 151,220.

*To all whom it may concern:*

Be it known that I, HENRY M. BROOKFIELD, a citizen of the United States, residing in the city, county, and State of New York, have invented a new and useful Improvement in Presses for Making Glass Articles, of which the following is a full, clear, and exact specification, reference being had to the accompanying drawings, which form a part hereof.

This invention relates to presses for making glass bottles or similar articles, and has special reference to the manufacture of hollow glass articles, although some parts of the invention might be employed in presses for making other kinds of articles.

The object of the invention is to simplify and improve the construction of such presses, to increase their capacity or efficiency, to enable the different parts of the operation to be carried out automatically, to decrease the cost of making the articles and to improve their quality, to make them more regular and perfect in form, and to prevent distortion and injury to the same while being made.

Another object of the invention is to improve the construction of the molds which are used in such presses, to cause the molds to discharge the bottles or other articles with certainty and without distortion or injury, to improve the means for opening or closing the molds and to make such operation automatic.

Another object of the invention is to provide means whereby the article is given a preliminary molding in one section or part of a mold, and is thereafter inclosed in another section or part of a mold, and is then blown out so as to fill the interior space of this latter section of the mold, the said means being operated automatically and the different parts being properly timed.

My invention consists first in the combination, in a press for making glass bottles or other articles, of a mold consisting of three sections, each section being divided vertically, or substantially so, preferably into two parts, these parts being preferably hinged together, the three sections being so arranged and combined that the second section, which is adapted to give a preliminary forming to the lower part of the article, can be opened and moved out of operative position after the preliminary forming, and the third section can then be moved into operative position in place of the second section, and means for opening and closing the different sections at the proper times, and a plunger to give the article the preliminary forming in the second section of the mold, and means to blow the glass out or otherwise cause it to fill the third section of the mold. In the best form of my invention the different sections of the molds are opened and closed by means of cam-surfaces, half of the cam-surfaces being connected with the plunger and the other half of the cam-surfaces being connected with the sections of the mold, whereby the operation of the different sections of the mold is properly timed with reference to the motion of the plunger.

My invention also consists in the combination, with the other necessary parts, of a blowing device or blower-head connected with a suitable source of fluid under pressure, the blowing device being adapted to be moved onto or applied to the top of the mold and removed therefrom, whereby at the proper time in the operation of the device the mass of glass in the mold can be blown out so as to fill the same and so as to be blown into the form of a bottle or other hollow article. In the best form of my invention the blowing device is operated by means of a cam suitably supported in the press and is provided with an automatic valve adapted to open when the blowing device is moved onto the top of the mold and to close when the blowing device is removed from the mold.

My invention also consists in the combination, with a series of my improved molds, of a rotary table which supports the molds and with which the molds rotate, and a series of plungers for the molds, and a series of cams for operating the different sections of the molds and the plungers, and a blowing device, and means for operating the blowing device.

My invention also consists in certain other features of construction and combinations of parts hereinafter described and claimed.

In the drawings accompanying this specification I have shown a form of press for making glass bottles which embodies my invention in its preferred form, and I will now proceed to describe the press which is shown in the drawings.

Figure 5:
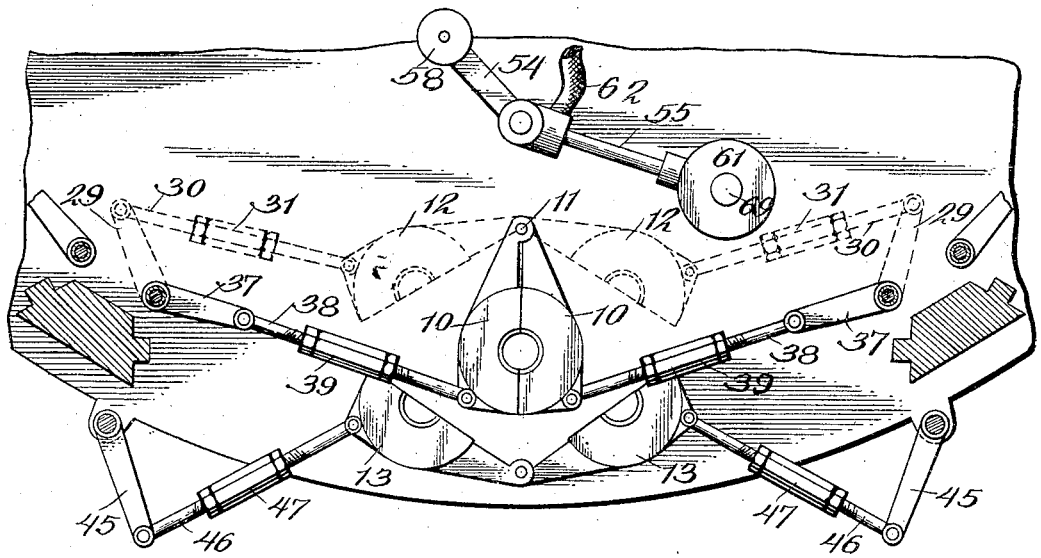
Figure 6:
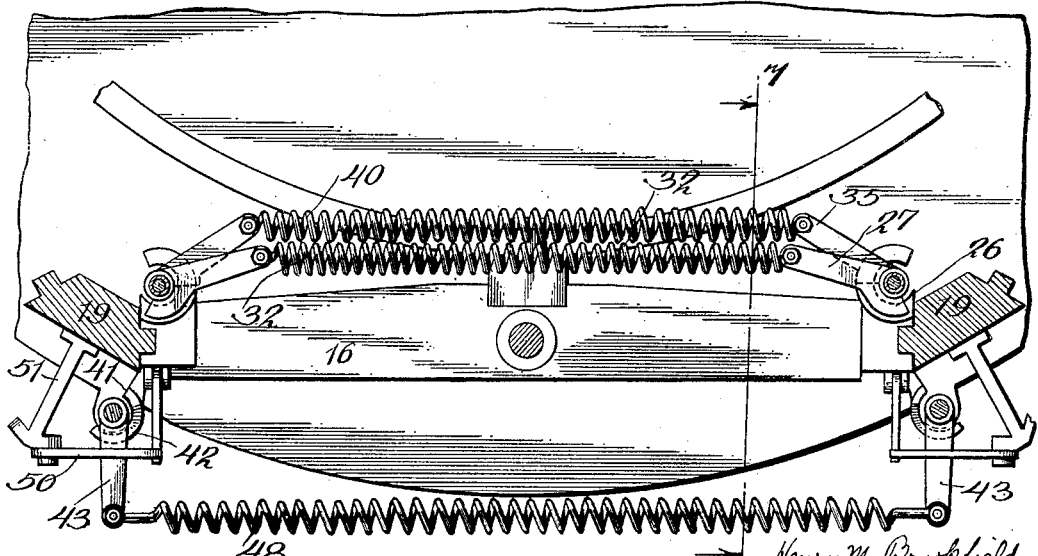

In the drawings, Figure 1 is an elevation or what might be called a "front" view of the press. Fig. 2 is a top view of the rotary table and molds thereon and connected parts, showing also one cross-head. Fig. 3 is a vertical cross-section on the line 3 3 of Fig. 2. Fig. 4 is an enlarged front view of one of the cross-heads and the mold and table immediately beneath it. Fig. 5 is a top view of one of the molds, taken on the line 5 5 of Fig. 4. Fig. 6 is a top view of one of the cross-heads and certain connected parts, taken on the line 6 6 of Fig. 4. Fig. 7 is a cross-sectional view of one of the cross-heads with its cams, taken on the line 7 7 of Fig. 6. Fig. 8 is a detailed view showing the construction of the blower-head. Figs. 9 to 14 are sectional views of the mold, showing the bottle at six different stages of its manufacture.

Similar numbers indicate similar parts in different figures.

Referring to the drawings, 1 is a stationary table or support for the press, which is provided with a central standard 2, which at its upper part is made hollow, as shown in Fig. 3, to afford a means of supplying the compressed air to the blower-head.

3 is a rotary table mounted so as to turn on the central standard. The rotary table is supported upon a bearing-plate 4, which is adapted to revolve around the central standard and which turns upon ball-bearings 5, the balls being supported in a groove in a bearing-plate 6, carried by the stationary table 1. The bearing-plate 4 has a sleeve projecting downwardly around the central standard, and to the lower end of this sleeve is fastened a worm-wheel 7, which is driven by a worm 8. The worm 8 can be driven by any suitable means. Any suitable means may be employed, however, for rotating the table 3. The rotary table carries a series of molds. In the particular form of the press illustrated in the drawings six molds are shown placed at equal distances around the table. The number of molds may, of course, be varied. The mold is made in three sections, each section being divided vertically into two parts, and these parts being pivoted to each other.

10 10 are the two jaws or parts of the top section of the mold. These two parts are pivoted together at 11. (See Fig. 5.) This top section of the mold is adapted to form the upper part or neck of the bottle, as clearly illustrated in Figs. 9 to 13.

There are two lower sections to the mold, one of which is adapted to be moved into operative position to aid in a preliminary molding or forming of the glass and the other of which has an interior space or recess of the form to be given to the completed article and is adapted to be moved into operative position after the glass has received its preliminary molding or forming.

12 12 are the two parts or jaws of the lower section of the mold adapted to give the preliminary shape to the mass of glass, as clearly illustrated in Fig. 10. The jaws 12 12 are pivoted together at 11. (See Fig. 5.) 13 13 are the two parts or jaws of the third section of the mold. After the glass has been given a preliminary forming or molding in the manner illustrated in Fig. 10 the jaws 12 12 of the second section are opened and the jaws 13 13 of the third section are moved into operative position and closed around the previously formed or shaped part of the glass, as clearly illustrated in Fig. 11. The glass is then ready to be blown out, so as to fill the third section of the mold. This blowing operation is accomplished by a device which will be hereinafter explained.

The different sections of the mold are opened and closed by means of cam-surfaces connected with the cross-head which supports and operates the plunger, by means of which the preliminary molding of the glass is accomplished.

14 is the plunger. It is carried at the lower end of a reciprocating rod 15. This rod, (see Fig. 3,) is adapted to move up and down for a limited distance in a bearing in the cross-head 16 and in an elongated bearing 17 in a disk or plate 18. The plate 18 is rigidly connected with the rotary table by means of guide-posts 19, which act as guides for the ends of the cross-head 16. The reciprocating rod 15 is provided with collars 20 and 21, one above and the other below the cross-head, and a coiled spring 22 is interposed between the under side of the cross-head and the collar 21. When the cross-head rises and strikes the collar 20, the rod 15 is caused to rise with the cross-head. When the cross-head moves downwardly, it forces the rod and plunger down, but with a yielding pressure. The motion of the cross-head is controlled by means of a circular cam or cam-track 23. (See Figs. 2 and 3.)

24 is a roller suitably connected with the cross-head and adapted to travel on the upper surface of the cam 23 when the rotary table, together with its series of cross-heads and plungers and rods, revolves. The cross-head moves down by reason of its own weight and is lifted by the cam 23. Each cross-head moves on guides on the posts 19, as clearly illustrated in Fig. 2. The plunger 14 is made of such a shape as to give the mass of glass a proper preliminary forming, as shown in Fig. 10.

The different sections of the mold are operated as follows: The cross-head is provided at each end with a projecting portion having a cam-surface 25. (See Fig. 7.) When the cross-head is raised, this cam-surface strikes against a cam-surface 26 on an arm 27, which is rigidly fastened to a vertical rock-shaft 28. This rock-shaft 28 turns in bearings in the rotary table and in disk 18. An arm 29 is rigidly fastened to the lower end of the rock-shaft 28 (see Fig. 5,) and the outer end of this arm 29 is pivotally connected, by means of a rod 30, with one of the jaws or parts 12 of the mold. The rod 30 is provided with a turn-buckle 31, by means of which the length of this rod may be properly adjusted. When the cam-surface 25 strikes the cam-surface 26, the arm 27 is moved outwardly or away from the cross-head, and the jaws 12 of this section of the mold are drawn apart or opened, so as to be in the position indicated in dotted lines in Fig. 5. When the cross-head falls, the jaws 12 12 of the mold are closed by the operation of a coiled spring 32, (see Fig. 6,) which draws the arms 27 27 together, thereby closing this section of the mold. The cross-head is also provided with a cam-surface 33, which in a similar manner to that already described strikes against a cam-surface on an arm 35 when the cross-head rises sufficiently. The arm 35 is rigidly connected at one end with a rocking sleeve 36, which encircles the rock-shaft 28. The sleeve 36 has an arm 37 rigidly connected to its lower end, and the outer end of this arm 37 is pivotally connected with one of the jaws 10 of the top section of the mold by means of a rod 38. This rod is also provided with a turnbuckle 39, by means of which its length may be adjusted. When the cross-head rises sufficiently, the arms 35 are turned in such a direction as to open the jaws 10 10 of the top section of the mold. When the cross-head falls, these jaws are closed by the operation of a coiled spring 40. (See Fig. 6.) The cross-head is also provided with a cam-surface 41, carried by a projection on the outer side of the cross-head. This cam-surface is adapted to bear against a cam-surface 42 on an arm 43, which arm is rigidly fastened to a rock-shaft 44. This rock-shaft is adapted to turn in bearings in the rotary table and the upper disk 18, as illustrated in Fig. 7. An arm 45 is rigidly connected with the lower end of the rock-shaft 44, and this arm is pivotally connected with one of the jaws 13 of the mold by means of a rod 46. This rod is provided with a turnbuckle 47, by means of which its length may be adjusted.

48 is a coiled spring connecting the ends of the two arms 43 (see Fig. 6) and operating to close the jaws 13, 13 of the mold when the cross-head is lowered sufficiently.

49 is a pawl pivoted to the cross-head, as shown in Fig. 7.

50 is a latch pivoted at one end to a bracket 51, projecting from the post 19. The latch 50 is provided with a downwardly-projecting tooth 52, adapted to catch over the edge of the arms 43, so as to hold these arms apart against the pressure of the coiled spring 48, and thereby hold the jaws 13 13 open until the latch 50 is raised by the pawl 49. When the cross-head rises, the pawl 49 strikes the latch 50 and raises the latch so as to disengage the tooth 52 from the arm 43. The coiled spring 48 then draws the arms 43 together and closes the jaws 13 13 of the mold. As the cross-head continues to rise the pawl 49 slips past the free end of the latch 50, enabling the latch 50 to again fall into its first or operative position. The cam-surface 41 then strikes against the cam-surface 42 on the arms 43 and moves the arms outwardly or away from each other, thereby opening the jaws 13 13 of the mold. A suitable stop of any kind should be provided to prevent the latch 50 from falling below its operative position, such as is represented in Figs. 4 and 7.

In the particular form of machine shown in the drawings there are six cross-heads, one for each mold, and these cross-heads are constructed exactly alike, as are also their connecting parts and the parts that operate the jaws of the molds.

53 is a blowing device. The construction of this device is shown in detail in Fig. 8, and the interior construction of the head itself is shown in Figs. 12 to 14. This device consists of a bell-crank lever having an inner arm 54 and an outer arm 55. This bell-crank lever is pivoted on a stud 56, which is permanently secured to the rotary table. The stud has a collar at its upper end and is encircled by a coiled spring 57. This coiled spring tends to press the blowing device upwardly on the stud 56, and thus to hold it in its highest position. The lower end of the spring 57 is permanently fastened to the table by being inserted in a hole in the table or by any other means. The upper end of the spring is fastened in like manner to the bell-crank lever. The inner arm 54 is provided with a cam-roller 58, which at a certain point in the rotation of the table rides upon a cam or cam-track 59. The cam-track 59 is supported by arms 60, supported in fixed position from the central standard 2. The outer arm 55 of the blowing device is provided with a passage-way communicating with the interior space of a blower-head 61. 62 is a flexible pipe connecting the passage-way in the arm 55 with a circular pipe 63, which is carried by and revolves with the rotary table and which is connected by a pipe 64 with a compressed-air chamber 65, (see Fig. 3,) formed around the central standard 2. The passage on the interior of the central standard communicates with the air-chamber 65 by perforations, as shown in Fig. 3. Compressed air is supplied to the upper end of the passage through the central standard by any suitable means. (Not shown in the drawings.) In this way air or other fluid under any suitable pressure is supplied to the blower-head. The blower-head is supplied with a projecting portion 66 on its under side, through which is a discharge-opening, through which the fluid under pressure is discharged into the molds, so as to blow the glass. 67 is an automatic valve or valve-piece provided with pins 68, projecting through holes in the bottom of the blower-head. When the blower-head is moved over the mold and pressed down upon the mold, these pins strike the top of the mold and are forced upwardly, thereby opening the valve and permitting the air to pass down into the mold. When the blower-head is removed from the top of the mold, the valve is automatically closed by the pressure of the air in the blower-head. When the roller 58 is not in contact with the cam 59, the spring 57 holds the blower-head out of operative position—that is to say, to one side of the mold. When by the rotation of the rotary table the roller 58 is made to ride upon the cam 59 the blowing device is swung upon the stud 56 and the blower-head is brought exactly above the mold, as represented in Fig. 2 at the upper side thereof. The spring 57 holds the blowing device in its highest position while the blower-head is being swung over the mold. The blower-head has a stud 69 projecting from its upper side. This stud is provided with a recess in its upper end, as indicated in Fig. 3. After the blower-head has been swung over the mold the cross-head 16 moves downward for a short distance, causing the plunger 14 to enter the recess in the upper end of the stud 69 and to press the blower-head down upon the mold and into the position indicated in Fig. 12. When the blower-head is thus forced down upon the top of the mold, the valve 67 is opened, as already explained.

The operation of the press is as follows: When a mold is in the position represented at the bottom of Fig. 2, the jaws 10 10 of the top section and 12 12 of the second section of the mold are closed, the jaws 13 13 of the third section being open. At this time the cross-head and plunger are in a raised position, such as indicated in Fig. 1. A proper quantity of glass is supplied to the mold, the position of the parts of the mold with the charge of glass at this time being represented in cross-section in Fig. 9. As the table rotates in the direction indicated by the arrow at the bottom of Fig. 2 the cross-head moves down and forces the plunger into the glass in the mold, thereby giving the glass a preliminary forming, as indicated in cross-section in Fig. 10. As the table continues to rotate, the cam 23 operates to lift the cross-head and plunger until the cam-surfaces 25 operate in the manner already explained to open the jaws 12 12 of the mold. The cross-head continuing to rise, the pawls 49 lift the latches 50 out of engagement with the arms 43, whereupon the spring 48 closes the jaws 13 13 of the third section of the mold, the parts of the mold then being in the position represented at 70 in Fig. 2 and represented in cross-section in Fig. 11. The jaws 13 13 of the mold have a larger interior space than the jaws of the second section and have the form of the bottle or article to be molded. Upon the further rotation of the table the blower-head 61 is moved into operative position over the mold by the cam 59 and is forced down upon the mold by a slight downward movement of the cross-head, causing the plunger to press upon the upper end of the stud 69. The position of the parts at this time is represented in section in Fig. 12. When in this operation, the valve 67 in the blower-head is open, the compressed air is forced through the discharge-opening of the blower-head and blows the glass outwardly, causing it to fill the mold and form a bottle or other article of the desired outline. The position of the parts at this time is represented in section in Fig. 13. As the table continues to rotate the cross-head rises until the cam-surfaces 33 and 41 operate in the manner already explained to open the jaws 10 10 and 13 13 of the mold, thereby releasing the bottle or other article, which drops through an opening 71 in the rotary table immediately underneath the mold. In the best form of my invention I so arrange the cam-surfaces that the jaws 13 13 are opened slightly in advance of the jaws 10 10. The part 66 projecting downwardly from the blower-head and entering the neck of the bottle serves to hold the bottle in place while the jaws of the mold are being opened and to prevent the bottle or other article from being forced out of position or to prevent its clinging to the walls of the mold. The part 66 therefore holds the bottle in place and serves as a guide to cause it to fall through the opening 71 in the table without injury to the bottle. The position of the parts when the mold has been opened and the bottle is dropping through the table is represented at 72 in Fig. 2, except that the blower-head has been broken away, so as to show the opening in the table and the bottle passing through the same. As the table continues to rotate the cross-head descends, the coiled springs 32 and 40 operating to close the jaws 10 10 and 12 12 of the mold preparatory to a repetition of the operation. The closing of the jaws 13 13 at this time is prevented by the fact that when the cross-head descends, so as to permit the arms 43 43 to be drawn together, these arms are caught and held by the latches 50 with their teeth 52 until the cross-head rises in the next operation of the press. When the cross-head moves down, the pawls 49 turn upon their pivots and slip past the latches 50.

It is obvious that many of the details of my improved press may be varied without departing from my invention and that the invention and the different parts thereof may be embodied in other specific forms of apparatus.

Many advantages are secured by my invention, some of which are as follows: A bottle or other similar article is produced upon the press automatically and delivered in its final or complete form through the opening 71 in the table. The only manual labor required is that of supplying the charges of glass to the mold. The apparatus is simple in its construction and operation and requires a minimum of attention. The capacity and efficiency of the press are greatly increased. The cost of the bottles or other articles is materially decreased. The articles are more exact and regular in form and of a superior quality. The distortion of the article itself during its manufacture is prevented. The articles after being formed are automatically discharged from the press and can be annealed in any suitable way. A fluid under pressure is employed for blowing or forming the article, and this is controlled by a simple mechanism not liable to get out of order, and the loss of any substantial amount of compressed fluid is prevented by automatic devices. The glass is given a preliminary molding by means of suitable jaws, so as to evenly distribute the mass of glass on all sides before the glass is blown out into the final molds. The jaws of the second section of the mold are automatically moved out of place to enable the jaws of the third section to be swung into place for the final act of blowing.

What I claim as new, and desire to secure by Letters Patent, is—

1. In a press for making hollow glass articles, the combination of a mold consisting of three sections, each section divided vertically, so arranged that the second section can be opened and moved out of operative position and the third section moved into its place and closed, cam-surfaces connected with the parts of the mold, a plunger, cam-surfaces connected with the plunger and coöperating with the other cam-surfaces to open and close the sections of the mold at proper times, and means to form the glass in the third section of the mold.

2. In a press for making hollow glass articles, the combination of a mold consisting of three sections, each section divided vertically, so arranged that the second section can be opened and moved out of operative position and the third section moved into its place and closed, cams for opening and closing the sections of the mold at proper times, a plunger to give the article a preliminary forming in the second section of the mold, and a blowing device adapted to blow the glass so as to fill the interior space of the third section, and a cam to move the blowing device into operative position over the mold, and a spring to move the blowing device away from the mold.

3. The combination of a mold for making hollow glass articles, a plunger, means for operating the plunger, the blower-head 61, a pivoted lever carrying the blower-head, means for operating the lever so as to bring the blower-head over or away from the mold, the spring 57, and means for causing the plunger to press the blower-head down on the mold and the valve 67 and the pins 68.

4. In a press for making hollow glass articles, the combination of a mold consisting of three sections, each section divided vertically, so arranged that the second section can be opened and moved out of operative position and the third section moved into its place and closed, rock-shafts connected with the parts of the mold, cam-surfaces connected with the rock-shafts, a cross-head, a plunger carried by the cross-head, cam-surfaces on the cross-head coöperating with the other cam-surfaces to open and close the sections of the mold at the proper times, and means to form the glass in the third section of the mold.

5. In a press for making hollow glass articles, the combination of a mold consisting of three sections, each section divided vertically, so arranged that the second section can be opened and moved out of operative position and the third section moved into its place and closed, rock-shafts connected with the parts of the mold, cam-surfaces connected with the rock-shafts, a cross-head, a plunger carried by the cross-head, cam-surfaces on the cross-head coöperating with the other cam-surfaces and springs acting in opposition to the cam-surfaces, the parts being arranged to open and close the sections of the mold at the proper times, and means to form the glass in the third section of the mold.

6. In a press for making hollow glass articles, the combination of a mold consisting of three sections, each section divided vertically, so arranged that the second section can be opened and moved out of operative position and the third section moved into its place and closed, means for opening and closing the first and second sections of the mold at the proper times, rock-shafts connected with the parts of the third section of the mold, arms carried by said rock-shafts, cam-surfaces connected with the rock-shafts, a cross-head, a plunger carried by the cross-head, cam-surfaces on the cross-head coöperating with the other cam-surfaces to open or close the third section of the mold, a spring connecting the arms on the rock-shafts and acting in opposition to the cam-surfaces, latches to engage the arms, and pawls carried by the cross-head and adapted to trip the latches, substantially as set forth.

7. In a press for making hollow glass articles, the combination of a rotary table, a plurality of molds rotating with the table, each mold consisting of three sections, each section divided vertically, so arranged that the second section can be opened and moved out of operative position, and the third section moved into its place and closed, a plurality of cross-heads one for each mold, guides rotating with the table in which the cross-heads reciprocate, a plurality of plungers one carried by each cross-head, cam-surfaces connected with the parts of each mold, cam-surfaces connected with each cross-head and coöperating with the other cam-surfaces to open and close the sections of the mold at the proper times, a stationary cam to operate the cross-heads, and means to form the glass in the third section of each mold, substantially as set forth.

8. In a press for making hollow glass articles, the combination of a rotary table, a plurality of molds rotating with the table, each mold consisting of three sections, each section divided vertically, so arranged that the second section can be opened and moved out of operative position, and the third section moved into its place and closed, a plurality of cross-heads one for each mold, guides rotating with the table in which the cross-heads reciprocate, a plurality of plungers one carried by each cross-head, cam-surfaces connected with the parts of each mold, cam-surfaces connected with each cross-head and coöperating with the other cam-surfaces to open and close the sections of the mold at the proper times, a stationary cam to operate the cross-heads, and a plurality of blowing devices, one for each mold, adapted to blow the glass so as to form it in the third section of the mold.

9. In a press for making hollow glass articles, the combination of a rotary table, a plurality of molds rotating with the table, each mold consisting of three sections, each section divided vertically, so arranged that the second section can be opened and moved out of operative position, and the third section moved into its place and closed, a plurality of cross-heads one for each mold, guides rotating with the table in which the cross-heads reciprocate, a plurality of plungers one carried by each cross-head, cam-surfaces connected with the parts of each mold, cam-surfaces connected with each cross-head and coöperating with the other cam-surfaces to open and close the sections of the mold at the proper times, a stationary cam to operate the cross-heads, and a plurality of blowing devices, one for each mold, adapted to blow the glass so as to form it in the third section of the mold, and means automatically actuated to move the blowing devices into and out of operative position at the proper times.

10. In a press for making hollow glass articles, the combination of a rotary table, a plurality of molds rotating with the table, each mold consisting of three sections, each section divided vertically, so arranged that the second section can be opened and moved out of operative position, and the third section moved into its place and closed, a plurality of cross-heads one for each mold, guides rotating with the table in which the cross-heads reciprocate, a plurality of plungers one carried by each cross-head, cam-surfaces connected with the parts of each mold, cam-surfaces connected with each cross-head and coöperating with the other cam-surfaces to open and close the sections of the mold at the proper times, a stationary cam to operate the cross-heads, and a plurality of blower-heads, one for each mold, rotating with the table and connected with a source of fluid under pressure, and a valve in each blower-head, and a stationary cam to operate the blower-heads at the proper times.

11. In a press for making hollow glass articles, the combination of a rotary table, a plurality of molds rotating with the table, each mold consisting of three sections, each section divided vertically, so arranged that the second section can be opened and moved out of operative position, and the third section moved into its place and closed, a plurality of cross-heads one for each mold, guides rotating with the table in which the cross-heads reciprocate, a plurality of plungers one carried by each cross-head, cam-surfaces connected with the parts of each mold, cam-surfaces connected with each cross-head and coöperating with the other cam-surfaces to open and close the sections of the mold at the proper times, a stationary cam to operate the cross-heads, and a plurality of blower-heads, one for each mold, rotating with the table and connected with a source of fluid under pressure, and an automatic valve in each blower-head, and a stationary cam to operate the blower-heads at the proper times.

In testimony whereof I have signed my name to this specification in the presence of two subscribing witnesses.

HENRY M. BROOKFIELD.

Witnesses:
 EDWIN SEGER,
 JOHN E. GEMPLER.